United States Patent [19]

Klein

[11] 4,178,246

[45] Dec. 11, 1979

[54] SEPARATOR FOR DISCRETE SOLIDS FROM LIQUIDS

[76] Inventor: Max Klein, 257 Riveredge Rd., Tinton Falls, N.J. 07724

[21] Appl. No.: 802,252

[22] Filed: May 31, 1977

[51] Int. Cl.$^2$ ............................................. B01D 23/26
[52] U.S. Cl. ..................................... 210/82; 210/411; 210/415; 209/306
[58] Field of Search ............... 209/305, 306, 300, 273, 209/406, 379, 380; 210/82, 414, 249, 457, 418, 411, 412, 415

[56] References Cited

U.S. PATENT DOCUMENTS

| | | | |
|---|---|---|---|
| 795,823 | 8/1905 | Darling | 209/273 X |
| 964,144 | 7/1910 | Chavanne | 209/406 X |
| 1,000,086 | 8/1911 | Goetz | 210/414 |
| 1,983,676 | 12/1934 | Reynolds | 209/403 X |
| 1,993,214 | 3/1935 | Hass | 210/415 X |
| 2,363,188 | 11/1944 | McDorman | 210/414 |
| 2,634,776 | 4/1953 | Kowan | 209/403 X |
| 2,751,079 | 6/1956 | Ahlmann | 209/380 X |
| 2,835,173 | 5/1958 | Martindale | 210/415 X |
| 2,846,075 | 8/1958 | Thomas | 210/457 |
| 3,071,248 | 1/1963 | Lowe | 209/406 |
| 3,275,156 | 9/1966 | Valtzner | 210/415 |
| 3,849,302 | 11/1974 | Seifert | 209/273 |

FOREIGN PATENT DOCUMENTS 46-22785  6/1971  Japan .................................... 209/380

Primary Examiner—Robert Halper
Attorney, Agent, or Firm—A. A. Orlinger

[57] ABSTRACT

Method and apparatus of concentrating solids from a suspension by feeding material in a liquid medium to a first zone that includes a vertically oriented foraminous filter basket supported by circular bands which are connected to an open frame basket supporting cage. Rotary impeller arms significantly spaced from the basket inclined from the vertical and located about midway of the lower half of the basket impart a circular laminar movement to the material. A vertical cylindrical tank surrounds the basket. Filtrate is collected in the annular region between the basket and tank. Discharge outlets with rate of discharge controls extend outwardly and downwardly from the bottom of the separator apparatus. Operation can be batch or continuous with level of filtrate in the tank being maintained on a par with the level of the feed in the basket.

17 Claims, 4 Drawing Figures

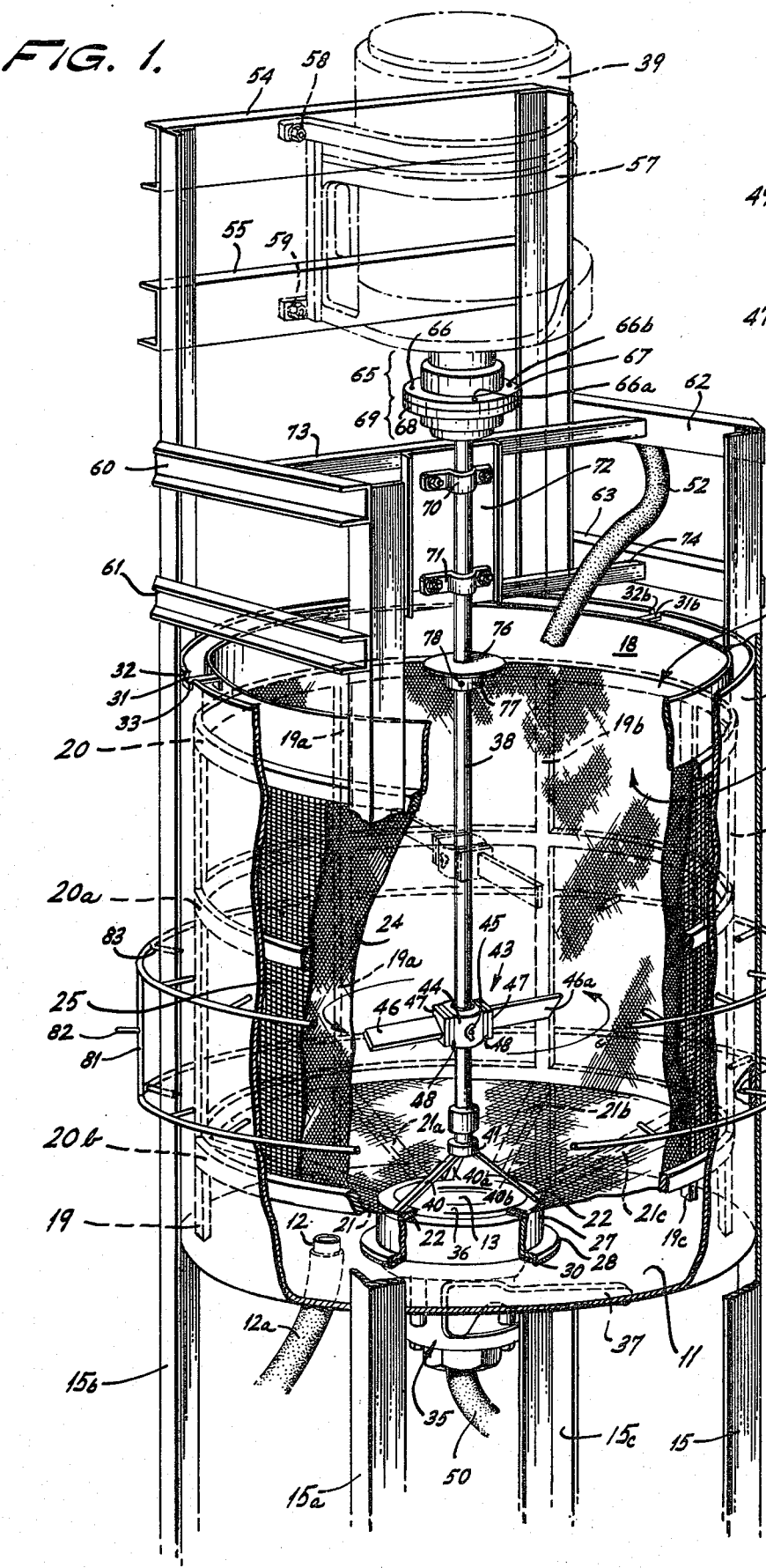
FIG. 1.
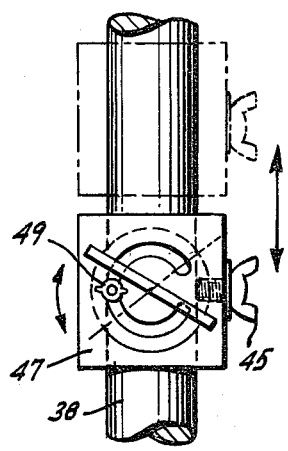
FIG. 2.
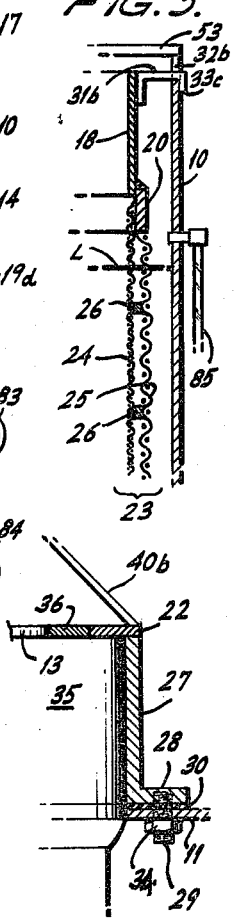
FIG. 3.
FIG. 4.

SEPARATOR FOR DISCRETE SOLIDS FROM LIQUIDS

This invention is that of an apparatus for, and a method of, concentrating and separating discrete pieces of solids, such as granules, pellets and particles, from a suspension, slurry or mixture of them in liquid media. More particularly, the apparatus and method of the invention are useful for separating from a liquid medium such discrete solid materials which, in a filtering step, are prone to clog or blind a foraminous screen, for example, a wire mesh filter screen, and thereby interrupt the filtering, before a practical extent of filtration can be reached, and thus prevent conducting continuous filtration. Such screen blinding is prone to occur in the filtration of suspensions of such solid discrete materials especially when associated with any clingy or glutinous substances.

A feature of the invention is that it provides a filtering apparatus of relatively simple construction and operation with continuous concentration and separation of granules, pellets or particles of materials which otherwise could clog or blind a foraminous filtering screen, from a liquid medium.

Broadly considered, the apparatus or separator of the invention comprises a cylindrical separator tank having suitably supported in it and concentrically spaced away from its inner wall a cylindrical filter basket assembly having a cylindrical filter screen member composed of a relatively fine mesh filter screen scatteredly spot-welded to a larger mesh supporting or back-up screen (with both jointly called the "double mesh filter screen") and jointly supported in an open-frame, cylindrical basket-screen-supporting cage having a bottom frame portion ending in a screen-bracing ring (advantageously having its center on the tank axis) encircling and liquid-tightly engaging a concentrated solids effluent outlet valve beneficially discharging through the bottom of the tank. The double-mesh filter screen continues from the bottom of its cylindrical wall extending over the upper surface of the bottom frame of the supporting cage to the screen-bracing ring.

An effluent filtrate outlet extends out of the tank from below the lowest filter screen area.

A rotatable agitator shaft extends with its axis coincident with the axis of the tank toward and near the solids effluent outlet valve. At least one set of paddle arms extends radially outwardly from the agitator shaft to an extent of from about one-third to two-thirds of the filter basket radius. Driving means (e.g. a variable speed motor) are provided to rotate the agitator shaft at any required rate, for example, from as little as 100 or less r.p.m. (revolutions per minute) to as much as 300 or more r.p.m. The paddle arms are affixed to the agitator shaft preferably by means that enable changing their elevation along the shaft and also the angle of, for example, the leading surface of the paddle to the horizontal.

The construction of the separation apparatus of the invention, and the separation method available by its use, are more readily explained by reference to the accompanying drawing, wherein, FIG. 1 is a broken open perspective view of the separator in elevation showing the relationship of its constituent parts to one another;

FIG. 2 is an enlarged fragmentary view of the agitator shaft showing means for adjusting the elevation of the agitator paddles along the height of the shaft and means for enabling adjusting the inclination of the paddle arms;

FIG. 3 is an enlarged fragmentary view taken along the line 3—3 of FIG. 1 and showing the specific relationship between the tank wall, the filter screen and back-up or support screen of the separator basket; and FIG. 4 is an enlarged fragmentary view taken along the line 4—4 of FIG. 1 and showing the relationship between the screen-bracing ring and the solids concentrate effluent valve and as secured to the tank bottom.

FIG. 1 shows the cylindrical tank 10, with its integral closed bottom 11 having a filtrate outlet 12 and separated from it a concentrated solids outlet 13 surrounded by the screen-bracing ring 22 of the basket assembly 14. Tank 10 is supported above the floor by, for example, four angle iron legs 15, 15a, 15b and 15c spaced peripherally 90 degrees apart from one another around, and with each touching, the peripheral wall of tank 10 with its bottom 11 resting on four horizontal angle irons (not shown) on the same level and with each separate one of them extending between and bolted to its respective pair of legs 15 to 15c.

Filter basket assembly 14 consists of (a) its open-frame basket assembly-supporting cage 17 having (i) a top circular suspension band 18 concentrically and radially shortly (about 3 inches) inwardly spaced away from the upper end of tank 10, (ii) a plurality (e.g. eight) of vertical cage-legs 19, 19a, 19b to 19g (spaced 45 degrees apart from one another) depending from and welded to the lower periphery of suspension band 18 and extending to and resting on the bottom of tank 10, and (iii) a plurality of (such as three) horizontal cage-legs-bracing rings 20, 20a and 20b vertically spaced apart from one another along the height of, and encircling and welded to, the cage-legs 19 to 19g at the respective points of intersection with them; and a plurality (in this embodiment also eight) of cage bottom slats 21 to 21g with each separate one extending inwardly radially downwardly from its respective junction with, and welded to, a respectively separate junction of a separate one of cage legs 19 o 19g with the lowermost bracing ring 20b, and in a plane of a shallow inverted cone and each ending at and there welded to the cage bottom-bracing ring 22 coaxial with the tank axis and spaced away from it about a quarter of the tank radius;

(b) a filter screen member 23 composed of a fine mesh (e.g. 36) filter screen and the larger or coarse mesh (¼ inch) supporting or back-up screen 25 directly contiguous to one another and spot-welded together at a suitable number of spaced apart points, and jointly welded around their upper contiguous peripheries to the lower peripheral edge of suspension band 18 and at points of intersection between the cage-legs 19 to 19g and their bracing rings; with filter screen member 23 continuing down the cage legs 19 to 19g to their junctions with the cage bottom slats 21 to 21g and then turning radially inwardly downwardly to contact with the upper surfaces of the bottom slats to cage bottom bracing-ring 22 and there welded to its peripheral edge where the bottom slats meet the ring 22; and (c) a short annular divider sleeve 27 having its upper peripheral end liquid-tightly welded to the underside of the radially outer peripheral end of basket bottom-bracing ring 22 and at its lower end a radially outwardly extending flange 28 having extending down from its underside a plurality (e.g. five) of threaded anchoring studs 29, with each separate one passing (i) in registry through a respective one of a corresponding number of holes in filtrate-resistant gasket 30 between flange 28 and the bottom of tank 10 and (ii) on through a respective one of a like number of correspondingly located holes in the bottom of tank 10, to extend sufficiently below its underside to enable a separate nut 34 to be drawn over the threads of each of studs 29 to draw flange 28 sufficiently tightly against gasket 30 to provide liquid-tight yet disengageable anchoring of flange 28 to the bottom of the tank.

The concentrated slurry of solids (e.g. granules, pellets or particles) accumulating in the bottom of filter basket assembly 14 is discharged advantageously centrally from that bottom as through a flush bottom tank ball valve 35 such as that of U.S. Pat. No. 3,367,623 (of Feb. 6, 1968). That part of this patent, which describes the construction and operation of this flush bottom tank ball valve is considered to be incorporated herein as if appearing fully set forth herein.

Flush bottom tank ball valve 35 is affixed to the bottom of basket assembly 14 by an integral (with valve 35) circular attachment disc 36 of such diameter enabling it, as inserted snugly in registry with the inner (i.e. smaller) periphery of basket cage bottom-bracing ring 22 with the top face of that disc 36 substantially co-planar with the top face of ring 22, to be butt-welded together with ring 22 (the thickness, from top to bottom, of ring 22 having been selected to be substantially the same as that of disc 36). Care is taken to have the junction between the top surface of each of disc 36 and ring 22 substantially free of any obstruction to the discharge flow of concentrated solids effluent. Thus, concentrated solids outlet 13 is the opening in attachment disc 36.

Ball valve 35 is operated by movement of its handle 37, and is closed with handle 37 positioned as in the drawing and fully open by rotating handle 37 clockwise 90 degrees, and is at various diminishing degrees of being open as handle 37 is being raised counter-clockwise to its finally closed position.

The upper end of filter basket assembly 14 is restrained against vibration during the operation of the apparatus by a plurality (e.g. four) of short restraining arms 31, 31a, 31b and 31c affixed to the free upper periphery of suspension band 18 and peripherally spaced 90 degrees apart and with each extending radially outward to engage in a respective correspondingly located short vertical slot 32, 32a, 32b and 32c in the upper periphery of the wall of tank 10 with each arm 31 to 31c ending in a short depending finger 33, 33a, 33b or 33c tightly yet disengageably contacting the outer wall of tank 10 just below its respective one of slots 32 to 32c.

Shaft 38 of the agitator extends, with its axis coincident with that of tank 10, downwardly into rotatable coaxial registry at its lower end in a bushing 41 supported, and welded to, a plurality (e.g. three) of bushing-bracing arms 40, 40a and 40b. These arms are spaced peripherally 120 degrees apart and extend radially outwardly downwardly, and are separately respectively welded, to the upper surface of basket cage bottom-bracing ring 22.

An impeller assembly 43 is mounted on shaft 38 by a collar 44 closely encircling and rigidly held at a fixed elevation about two-thirds the distance down from the top of the tank 10 (but elevationally adjustable to other levels) by a wing-headed set screw 45. Each of a pair of substantially rectangular impelling arms 46 (each being in length about five times its width) extends radially outwardly from its respective mounting on collar 44 to a point about 0.35 times the radius of the tank from its axis.

Each impeller blade 46 is fixedly mounted (in this embodiment) with its trailing surface being at an angle of 30 degrees to the horizontal (considering shaft 38 as rotating counter-clockwise as indicated by the arrows). Each impeller blade or arm, however, is adjustable to enable changing its angle to the horizontal by having at its inner end (i.e. toward shaft 38) a square mounting segment 47 and extending horizontally radially from the center of its full square face (i.e. nearer the shaft) a mounting and rotation peg (not shown) which is frictionally yet rotatably inserted in a female bore (shaped and dimensioned rotatably snugly to receive the mounting and rotation peg) in the contiguous peg-receiving square segment 48 (unitary with collar 44) and partially protruding into the adjacent part of impeller collar 44.

As seen in FIG. 2, each respective impeller blade 46 is held in fixed position on collar 44 by tightening the angle-fixing set-screw 49 with its threaded shank extending through the C-shaped slot 51 passing through the thickness of mounting and rotating segment 47 and engaging corresponding threads in peg receiving segment 48. Obviously, the angle of any impeller blade or arm 46 to the horizontal can be changed by loosening set-screw 49, rotating the arm about the rotation peg to the desired angle and then again tightening set-screw 49.

When needed, at least another impeller assembly similarly can be mounted on to agitator shaft 38, for example, as explained further below and shown in phantom in FIGS. 1 and 2.

Input discrete solids-liquid suspension or mixture can be fed into filter basket assembly 14 through a suitable input conduit, for example, mixture feed pipe 52 passing through a suitably located opening in a cover 53 for tank 10 and directed toward the open top of filter basket assembly 14.

Rear (as viewed in FIG. 1) angle iron legs 15b and 15c extend an adequate distance above the top of tank 10 and have affixed to them the rear pair of parallel horizontal steadying cross channels 54 and 55 to which is anchored by the two pairs each of bolts and nuts 58 and 59 the carriage 57 supporting motor 39 (shown in phantom as is also carriage 57).

Front legs 15 and 15a also extend above the top of tank 10 (to a height lower than rear legs 15b and 15c) and affixed to each one of them and a respective one of rear legs 15b and 15c is a respective pair of horizontally parallel and vertically spaced apart side-bracing channels 60 and 61 and 62 and 63.

The motor shaft (not seen) depends from motor 39 and through the bottom of its holding carriage 57 and is located by a removable key (not seen) to shaft-driven-mounting coupling 65. The latter is drivingly connected by a plurality (e.g. five) of nut-locked bolts 66, 66a, 66b, 66c and 66d extending through integral driving hub 67 of coupling 65 and through, and contiguously tightly bolted together with, the connecting disc 68 integral with coupling mate 69.

Coupling mate 69 is removably locked by a fixed key (not seen) to impeller shaft 38. Shaft 38 is steadied by passing through bearings held by straps 70 and 71 which are bolted vertically spaced apart from one another, each by its respective pair of bolts and nuts, running through support plate 72. This plate in turn is mounted on shaft-bracing brackets 73 and 74 vertically spaced apart from one another, the upper one being rigidly fixed to side-bracing channels 60 and 62 and the lower one so fixed to side-bracing channels 61 and 63.

To retard any liquid or mixture from splashing out of the hole in tank cover 53, through which shaft 38 extends, during any test runs, shaft 38 carries a splash shield 76 having a depending integral locking-collar 77 with a level-holding set-screw 78 passing through it to contact shaft 38 and thereby hold splash shield 76 against the underside of cover 53 to close off the shaft hole in it.

When another impeller assembly needs to be mounted on shaft 38, the nut-locked bolts 66, 66a, 66b, 66c and 66d are unlocked and removed, straps 70 and 71 are removed by unlocking their nuts and bolts, and then coupling mate 69 is slid away from mounting hub 67 and removed from the upper end of shaft 38 by withdrawing the key which locked mate 69 to shaft 38.

Then after set-screw 78 is unlocked, splash shield 76 is removed from shaft 38. It then is free to receive a second impeller assembly by inserting the upper end of shaft 38 through the collar of that impeller assembly and sliding the latter to a desired elevation along shaft 38 and locking that assembly in place by tightening its set-screw against the shaft.

In any initial trial run or runs to check for any operating conditions changes that may be needed when the apparatus is to handle a suspension or slurry different from what it handled previously, initially some screen (24) clogging might occur. To undo that, a water (or other liquid) backwash system is provided. That system comprises, for example, two horizontal, liquid distribution lines 79 and 80 encircling tank 10 at suitable levels vertically spaced apart from one another, one, say, at about a little above midway of the height of filter screen member 23 and the lower one about midway between the first one and the bottom of filter screen member 23.

Both distribution lines communicate with the supply lines connector 82 having a backwash liquid inlet 82 to receive that liquid from a suitable source (not shown). Connected with each of the distribution lines is a plurality of one-half inch stainless steel nipples 83 located, for example, at 45 degree intervals around the respective periphery of each distribution line and projecting radially through the wall of tank 10 only a distance sufficient for mounting a one-half inch high velocity full cone liquid spray head 84 on each nipple to enable impinging an adequate screen-unblocking spray against screen 24.

If for any reason in any such shortly above described test operations it is desired not to run the concentrated effluent exiting through the concentrated solids output line 50 from ball valve 35 to a collector for them, but also desired not to let those concentrated solids go to waste, they can be recycled into the filter screen member by being fed to a suitable pump (not shown) and from it to a suitable hose (not shown) back into the open top of the filter screen member.

Similarly, if in such test for any reason it is desired not to let the filtrate leaving from filter outlet 12 and outlet hose 12a flow to waste or to a holding tank or other desired end, such filtrate also can be fed to a pump (not shown) and by it propelled through a suitable hose back into the open top filter screen member or basket.

A suitable sight glass 85 (which can be as tall as tank 10 or at least as its upper half) is provided at any suitable element location in the outer wall of tank 10 at an elevation to enable observing the height of filtrate in the annular space between the inner wall of tank 10 and the outer wall of filter basket assembly 14, to enable checking that elevation against the liquid level top in filter basket assembly 14.

It is preferred that tank 10 (including its cover) and all of the assemblies and parts carried in it, e.g. shaft 38 and all the parts carried on it, the filter basket assembly, the open frame basket assembly, the flush bottom tank ball valve, the water spray nipples and their supply lines, be made of stainless steel.

The apparatus of the invention, and practice of its method, is effective even if coarse mesh filter screen 25 of filter screen member 23 is omitted, particularly when the operation is carried out in merely a single batch at a time or only a short run. However, as both the apparatus and the method are effective in continuous operation over extended periods of time, it is advantageous to include coarse mesh filter screen 25 to serve as an extended backup or support for fine mesh filter screen 24, and thus extend the life of fine screen 24.

It occurs that at some time screen 24 may need a backwash liquid spray, for example, with certain materials such as for recovery of high impact polystyrene fine beads from the effluent obtained from a centrifuge (such as the Bird Machine Co., Walpole, Mass., centrifuge) after the suspension polymerization reaction product-containing suspension from the finished suspension polymerization is fed to the centrifuge for separation of the beads. After the completion of the run (in the apparatus of this invention) for recovery of the beads from the centrifuge filtrate and all of the new (in this apparatus) filtrate (in the annular space between the inside wall of tank 10 and coarse mesh filter screen 25) was drained out through filtrate outlet 12, it was noted that there were beads in most of the openings of the fine mesh screen 24. Then on impinging a backwash water spray stream from the nozzles 84, those beads were removed as a result of immediate and complete penetration of the backwash water stream through the pores of screen 24.

However, it is to be noted that while the just described run (recovery of beads from the centrifuge filtrate) was in operation, no blockage of screen 24 occurred to blind its pores against continued flow-through of liquid filtrate and retention of the separated beads within basket member 23 for removal through its concentrated solids outlet 13.

To attain operation of the apparatus without blinding fine screen 24, it is essential to adjust the rate of input feed of the particular starting slurry or suspension and discharge of filtrate through outlet 12 so as to maintain the level of filtrate in the annular zone between the tank wall and filter screen member 23 the same as that of the slurry content in the filter basket (as shown by reference line L in FIG. 3). The angle of the surface of the impeller arms 46 to the horizontal should be such as to provoke a cylindrically laminar rotation of the slurry mixture in the filter basket. That generally is attained when substantially no turbulence occurs in the rotation of the impeller arms in the slurry being treated and usually is indicated by the presence of a shallow vortex produced at the top of the slurry by the rotation of the impeller (or impellers).

In a specific apparatus embodiment: tank 10 has a five feet high cylindrical wall, three-sixteenth inch thick, welded to a one-quarter inch thick circular bottom five feet in diameter and elevated 26 inches above the floor, having 17 inches above the tank bottom a lower encircling backwash distribution line 80 and one foot above that one the upper such line 79; and with the 8 inches wide suspension band 18 and filter screen member 23 depending from it being 54 inches in inside diameter; cage legs 19 to 19c are 59 inches long ells (1.5 by 1.5 inches and three-sixteenths thick) welded, at their intersections with, to the 1.5 inch wide cage-legs-bracing rings 20 to 20b with the intermediate ring being 17 inches below the uppermost one, and the lowermost one being 10 inches above the tank bottom 11, wherein the diameter of solids outlet 13 is 5 inches and that of annular divider sleeve 27 is 18 inches;

each of slats 21 to 21g and cage bottom-bracing ring 22 is 1.5 inches wide, shaft 38 is 1.5 inches in diameter, each segment 47 and 48 is three-quarters inch thick and the impeller arms 46 are 7.5 inches long by 1.5 inches wide and three-eighths inch thick; legs 15 to 15c are 140 inches high, five by five inch by one-half inch thick ells; the diameter of fine mesh screen 24 wires is 0.006 and that of coarse screen 25 is 0.05 inch; NEOPRENE gasket 30 is one-eighth inch thick, and motor 39 is variable speed with a range up to about 350 r.p.m.

The apparatus is operated, for example, as follows:

Motor 39 is turned on to drive shaft 38 and impeller assembly 43 (with the trailing faces of its arms 46 and 46a slanted at 30 degrees from horizontal) and a second impeller mounted on shaft 38, about midway to the top of the slurry from impeller 43, and with the impelling surfaces of its arms perpendicular to the horizontal at the determined speed (e.g. 225 r.p.m.) for the specific mixture or slurry to be separated. Flush bottom valve 35 is closed and the filtrate outlet 12 is open. The slurry is fed into the top of filter screen 25 through the (e.g. 2 inch) feed pipe 52 protruding through cover 53 and extending about a couple of inches into the basket assembly 14.

The slurry feed input rate is adjusted to maintain the height of filtrate in the annular space between the inner wall of tank 10 and filter screen member 23 at a level equal to that of the height of the slurry in the screen member 23. The input flow of slurry is maintained at that steady rate until maximum solids concentration in the filter screen member basket assembly is attained, e.g. either on reaching the maximum volume capacity of the filter basket or the maximum driving load capacity of motor 39 (e.g. about 4 hours with the high impact polystyrene, of page 11 lines 14-20 above as the specific starting slurry).

As the foregoing was a batch operation because ball valve 35 remained closed, ball valve handle 37 then is turned clockwise to its fully open position with handle 37 extending directly downward and the concentrated solids then permitted to flow out through ball valve 35 by gravity and, if needed, with a minimum of assistance from dilution water fed into filter screen member 23 through a suitable hose extending through cover 53. After substantially all of the concentrated solids are discharged through valve 35, any solid granules or particles adhering to fine mesh screen 24 are removed by a quick short spray of backwash water from nozzles 84, supplied from a high pressure water source.

The apparatus may be operated, and the method of the invention conducted, as a continuous operation by starting as in the same way and same impellers settings and rotation rate as with the foregoing batch operation and with the same starting high impact polystyrene slurry, but in addition with opening ball valve 35 by adjusting the clockwise movement of handle 37 to a point at which a suitable head of slurry in the screen basket is reached and the level of the filtrate in the annular zone between screen member 23 and the inside wall of tank 10 is maintained the same as that of the content of screen member 23 at a steady feed of starting slurry of 50 gallons per minute.

The above-mentioned centrifuge effluent from the centrifugation of the discharged polystyrene beads admixed in the aqueous suspension mixture in which they were produced by suspension polymerization, contains at times possibly as little as 0.5%, and more often from 2 to about 5% of solids. These solids consist of by far the most part of polystyrene beads, tricalcium phosphate (as inorganic suspending agent) and a smaller amount of dispersed organic material usually colloidal.

That centrifuge effluent handled by the method and apparatus in the foregoing batch process at a rate of 50 gallons per minute showed at the end of a four hours run, after draining off the filtrate that passed through screen 24 into the annular space between the screen member 23 and the inner wall of tank 10 to its bottom under screen assembly 14 and out through filtrate discharge 12-12a, accumulated at the bottom of filter basket assembly 14 a conical mound (with its axis coincident with that of shaft 38) 13 inches deep around the periphery of shaft 38 and 4 to 5 inches deep around th lower end of the vertical portion of screen 23, and amounting to about 600 pounds of beads.

In spite of the fact that screen 23 was of 36 mesh, these accumulated recovered beads included a very significant portion smaller than 36 mesh and over 80 mesh. That is an economic advantage because the screen pore size of screen 23 can be larger than that required to withhold the particles to be recovered(even though in the dry state they would pass through a sieve having the pore size of screen 23).

That conical accumulation of the separated solids, e.g. these beads, demonstrates the advantage of having the discharge outlet for the separated solids located centrally through the bottom of tank 10 and beneficially coaxially with shaft 38. Thus, the combination of annular divider sleeve 27 jointly with its complete peripheral welding together to cage bottom-bracing ring 22 and liquid-tight engagement with tank bottom 11 through tight contact between flange 28 and basket 30 by the anchoring studs 29 and nuts 34, confines the discharge of concentrated solids through their outlet 13 and avoids admixture of them with the filtrate (discharged solely through its outlet 12).

No one set of operating conditions, such as those above used on the centrifuge filtrate from high impact polystyrene suspension polymerization, is suitable for separating discrete pieces of solids from every kind of suspension, slurry or mixture of them in a liquid medium. For example, while shaft rotation of 225 r.p.m. was effective for separating the high impact polystyrene beads, it was found that a shaft rotation of only 120 r.p.m. was effective to avoid screen blinding in the separation of polystyrene beads of so-called crystal polystyrene grade from the centrifuge filtrate of their separation from the finished suspension polymerization mixture.

Thus, the operating conditions effective for a specific slurry, dispersion or mixture can vary in accordance with any or all of its characteristics, such as viscosity, solids concentration, and configuration, extent and type of, say, soluble organic polymeric materials in the liquid phase. Thus, a limited small amount of testing may be needed to determine by trial and error, for example, the rate of feed and/or impeller speed and/or blade arrangement.

In general, turbulent agitation should be avoided because that ordinarily causes clogging or blinding of screen 23 due to the too fast impeller rotation. Also, too slow impeller rotation can cause blinding of the screen.

Ordinarily when other conditions that contribute to blinding of the screen are used, it should be possible to avoid that by rotating the impeller at a rate to provoke development of preferably a shallow vortex and thus enable operation with the screen remaining free from blinding.

It is advantageous, for example, initially to arrange for the rate of input feed of the suspension, slurry or mixture and of discharge of filtrate and/or concentrated solids to be so related to one another to maintain the level of filtrate in the annular space between the inside wall of tank 10 and filter basket assembly 14 at least equal that of the content surrounded by the filter basket. Thus, if screen 23 blinding occurs while that level is maintained, then the speed of rotation of the impeller may be too little and should be increased.

If blinding still occurs and turbulence of the mixture or dispersion occurs and the angle of incline of the trailing surface of impeller arms 46 (to the horizontal) is too high, then that angle should be reduced. If that eliminates the turbulence and the blinding of the screen, then the rate of starting mixture feed may be increased with corresponding adjustment of the rate of discharge of filtrate (through outlet 12) and/or of concentrated solids through outlet valve 35 to maintain the filtrate level in the annular zone between the tank wall and the filter screen at least equal to that of the mixture in the screen basket.

If the turbulence and screen blinding still occurs, then the impeller speed should be reduced until the turbulence is replaced by a shallow vortex and the blinding disappears.

That blinding has occurred can be recognized by the dropping of the annular ring of filtrate between the wall of tank 10 and the screen assembly as noted from the lowering of the corresponding liquid level in the sight glass.

Also, in undertaking to handle a more viscous dispersion, it could be beneficial to use somewhat longer impeller arms and preferably perhaps no longer than two-thirds of the radius of screen 24 and generally at least significantly less than its radius.

The current indication appears to be that improved results are obtained by including a second impeller assembly and benefically with its impelling surfaces of its paddles or arms positioned perpendicular to the horizontal.

Impeller shaft 38 depends on its bushing 41 ordinarily supported at a level of about 5 to 8 inches above the horizontal plane passing over the top surface of cage bottom-bracing ring 22.

For the practice of the method of the invention, circular suspension band 18 is not needed. However, from a practical consideration, it is advantageous to include it because it provides structural rigidity and strength to the filter basket. The same applies to the open-frame basket assembly supporting cage 17 (with its vertical cage-legs 19 to 19g and cage-legs bracing rings 20 to 20b), for example, by the welding of fine screen 24 to backup screen 25 at, and to, the intersections between the vertical cage legs and the horizontal cage-legs bracing rings.

The tendency of the concentrating solids to attain a conical array demonstrates the advantage of locating the concentrated solids outlet as in the embodiment shown in the drawing. Flush bottom ball valve 35 used there was able to drain the fully loaded 1000 gallon tank 10 in about 2 minutes.

This embodiment with the concentrated solids discharge from below the filter basket and through ball valve 35 into discharge line 50 provides a distinct advantage, for example, enabling lifting the entire filter basket assembly out of place for whatever reason that may be needed. Thus, after disconnecting filtrate discharge line 12a and concentrated solids discharge line 50, removing the anchoring nuts 34 from studs 29, and disconnecting impeller shafts 38 (as earlier above described), filter basket assembly 14 is free to be raised from tank 10.

Basket assembly 14 can be removed completely from tank 10, by unbolting bracing channels 60 to 63 and also carriage 57 holding motor 39. Alternatively, rear legs 15b and 15c can be made in two sections meeting at a level between the bottoms of side bracing channels 61 and 63 and the top of tank 10 and affixing a hinge to the rear flange of both parts of each of legs 15b and 15c at their dividing line to enable their upper parts to be rotated backwardly after making similar division of front legs 15 and 15a into two parts at the same level as these junctions in both parts of each of legs 15b and 15c.

Legs 15 and 15a otherwise could be locked in place by suitable unlockable locking means at that junction in each of those legs. Thereby after unlocking both parts of each of front legs 15 and 15a, that superstructure can be turned backward out of the way to permit complete removal of the filter basket assembly 14.

For any concentrating and separating operation of lesser magnitude than that with the 1000 gallon volume of the illustrated embodiment having the measurements given above (p. 12 line 19 to p. 13 line 12), the apparatus can be constructed in smaller capacity having even down to 100 or even 50 gallons volume tank (18 inches in diameter). In such smaller units it is possible correspondingly to reduce the size of some one or more of the elements of the apparatus and/or the number of any parts used in a plurality.

So also, the form or location of some of the parts may be changed. For example, instead of 8 vertical cage legs and 8 cage bottom slats, or 3 cage-legs bracing rings, a smaller number of any or all of them may be suitable. Then too, a smaller size flush bottom ball valve 35 may be used. Also, instead of having the concentrated solids discharge downwardly from the center of the bottom of the filter basket and tank 10, it may be discharged radially outwardly from an opening in the bottom of the cylindrical filter screen member 23 connection with a nipple extending across the annular space and out through an opening in tank 10 and with a concentrated solids outlet line 50 attached to the outer end of that protruding nipple.

In such small units, filtrate outlet 12 (and its line 12a) extending downward from the bottom of tank 10 could be moved to extend radially outwardly from the tank bottom.

Filter screen 24 is not restricted to a woven wire cloth screen. Any other comparable filter means may be used such as a slotted or punched out screen such as one having round or dash-shaped (e.g. in herringbone array) orifices, with pores of, for example, 0.1 millimeter or so in diameter or width respectively.

So also, screen 24 is not limited to the 36 mesh pore size for the screen pores of some other size can be used depending on the screen analysis of the granules, pellets or particles in the particular dispersion or slurry to be handled, bearing in mind that the apparatus of the invention and the method applicable with it, concentrates and separates particles which in the dry state would pass through the screen of the pore size used in the illustrative embodiment (as related at p. 15 lines 16–22 above).

The apparatus and method of the invention is not restricted to use with dispersions or slurries of polymer beads such as the above-mentioned two types of polystyrene beads, but is applicable also to other dispersions and slurries having a strong tendency to blind a separation screen. Thus, they are applicable also to separation of sand granules from the solution of petroleum oils in a solvent, e.g. kerosene, in the recovery of petroleum from oil sands such as found in various parts of Canada.

This apparatus and method can be used also for separating the inorganic particles insoluble in the organic solvents used in the desulfurization, and/or removal of solvent-soluble organic constituents, of finely divided coal. In these two other illustrative applications, because water also would be present in the liquid medium, for example, because of its presence in the starting material as in the case of the oil sands, only slight modification would be needed.

Thus, (i) the annular filtrate zone between filter screen member 23 and the cylindrical wall of tank 10 would need to be slightly wider to allow more ready separation of the immiscible organic solution to rise above the water layer, and (ii) an outlet at a level at about the upper end of that annular zone would be needed to allow the separated organic phase to be continually withdrawn (while the withdrawal of the aqueous phase is done in the same way as in the earlier described applications and so also as to the concentrated solids).

While the invention has been explained by detailed description of a specific embodiment of it, it is understood that as already explained various modifications and substitutions may be made in it within the scope of the appended claims deemed to cover also equivalents of the specific embodiments.

What is claimed is:

1. An apparatus for concentrating and/or separating discrete pieces of solids such as granules, pellets and particles from a suspension, slurry or mixture of them in a liquid medium, which suspension, slurry or mixture is prone to clog or blind a foraminous separation screen or other concentrating and or separating means that have been tried for separating said solid pieces from said liquid medium, which apparatus comprises a vertical cylindrical separator tank having a closed bottom, a cylindrical foraminous filter basket of smaller diameter and shorter height than said tank and having a cylindrical foraminous wall and a bottom integral with it and spaced upwardly away from the bottom of the tank, thereby providing a narrow cylindrical filtrate-receiving channel between said basket and tank and communicating with the space between their bottoms;

means connecting with said basket and firmly supporting it in stationary position coaxially within said tank and with the wall of the basket concentrically spaced inwardly away from the tank wall, driving means firmly supported above said tank and positioned and adapted for driving a rotatably mounted shaft extending therefrom coaxially into said basket, an impeller shaft coupled to said driving means and mounted to be rotatably driven thereby and extending coaxially into said basket to and supported from its bottom, a pair of diametrically aligned, substantially rectangular impeller arms each having a free end extending separately lengthwise radially outwardly from said shaft toward but significantly spaced away from the filter basket wall, at an elevation somewhat midway of the lower half of said basket, and with the leading face of each arm being positioned inclined from the vertical toward the direction of its rotation by the shaft to an extent thereby to be able to impart substantially cylindrical laminar movement to an aforesaid mixture charged into said basket from the mixture charging source, a filtrate discharge outlet extending from said tank from a level below the lowest filtering area of the filter basket, an outlet from the bottom of the filter basket for discharge of concentrated solids therefrom, and liquid-tight means liquid-tightly communicating with said solids discharge outlet and extending therefrom to outside of said tank at its bottom and preventing admixture with any of that filtrate outside of said basket.

2. Apparatus as claimed in claim 1, wherein the foraminous filter basket is composed of woven wire cloth of a mesh suitable for the separation to be performed with it, and said means for connecting with said basket for supporting it in stationary position is a circular bands with a diameter substantially the same as that of the cylindrical filter basket and the upper end periphery of said basket is securely affixed to the periphery of the lower end of said circular band, and the band is supported by a plurality of connecting means peripherally spaced apart from one another and engageably extending from the circular band to the tank wall.

3. Apparatus as claimed in claim 1, wherein the impeller arms are affixed to a hub or collar snugly encircling the impeller shaft and movable to any selected elevation within the recited level, and means are included for retaining said hub or collar at the selected elevation.

4. Apparatus as claimed in claim 1, wherein the impeller arms are mounted on a hub or collar carried on said impeller shaft and means are included to enable turning the individual arm about its horizontal axis to change the angle of its impelling surface to a horizontal plane drawn through the axis of rotation of said arm, and means are included to maintain the arm at the selected angle.

5. Apparatus as claimed in claim 1, wherein a sight glass is affixed in vertical position to the wall of the cylindrical tank at a location to enable observing the level of the surface of the filtrate in the annular zone between the tank wall and the filter basket.

6. Apparatus as claimed in claim 1, wherein there is included means for applying to said foraminous filter basket a liquid spray for removing from the filter basket any material which has blinded pores of said basket.

7. Apparatus as claimed in claim 6, wherein said means for providing the spray comprises horizontally encircling the cylindrical tank a conduit for conveying the spray liquid, a plurality of nipples communicating with said conduit and extending radially inwardly therefrom and through the tank wall and sufficiently spaced away from the filter member to enable a liquid spray from the nipples to reach the blocked area of the screens, and on the inner end of each of the nipples a spray nozzle to provide the spray of liquid to be used.

8. Apparatus as claimed in claim 1, wherein connected with each of the discharge outlets is its respective means for controlling the rate of discharge from the outlet.

9. Apparatus as claimed in claim 8, wherein the said discharge outlet for concentrated solids from the bottom of filter basket is a circular opening therein and encircled by a flat circular ring, to which the periphery of said circular opening is secured in a manner to assure that the solids accumulating at the bottom of the basket pass through said ring, and the liquid-tight means communicating with the solids discharge outlet is a short sleeve liquid-tightly secured at its upper peripheral end to said ring and with the lower peripheral end of said sleeve liquid-tightly surrounding and secured to an opening in the bottom of said tank coaxial with said ring in the bottom of the basket.

10. Apparatus as claimed in claim 9, wherein a flange integral with said sleeve at its lower periphery extends annularly outwardly from said sleeve and a plurality of threaded studs depend peripherally spaced apart from one another from the underside of said flange, the bottom of said tank has an opening like that of the open lower end of said sleeve, and said opening in the tank bottom is encircled by a same plurality of stud-receiving orifices peripherally spaced apart from one another at locations downwardly aligned with the corresponding studs in said flange, a circular gasket having an opening, of substantially the same size as that in the tank bottom and encircled by a peripherally spaced apart same number of stud-passing orifices as in the tank bottom, is positioned with the studs passing through the orifices in it and through the orifices in the tank bottom, and a separate nut is tightly turned over the protruding thread of each of said studs to pull the flange and tank bottom tightly against the gasket to provide a liquid-tight closure between them.

11. Apparatus as claimed in claim 8, wherein the bottom of said filter basket has an opening as the beginning of said outlet for concentrated solids discharge therefrom and said opening is encircled by a flat ring, to the substantially outer portion of the upper face of which is fixedly secured the inner end of the bottom of the filter basket.

12. Apparatus as claimed in claim 11, wherein an open-frame filter basket-supporting cage is rigidly secured at spaced apart locations to the lower end of the basket-supporting band and depends in contact with horizontally and vertically peripherally spaced apart locations on the exterior of the filter basket and under the bottom of it and terminates rigidly secured at peripherally spaced apart locations about said flat ring.

13. Apparatus as claimed in claim 12, wherein the foraminous basket consists of a fine mesh screen backed up in contact with a merely bracing much larger openings screen, both of which screens are welded together primarily at the intersections of circularly spaced apart vertical cage legs, and vertically spaced apart horizontal bracing ring members of said basket-supporting cage.

14. Apparatus as claimed in claim 13, wherein said wire cloth filter basket is contiguously enclosed in said backup supporting screen of coarse mesh extending all around and under the wire cloth basket and also affixed to said flat circular ring; from said circular band and affixed to it and in contact with said backup screen there depends said vertical cage legs horizontally spaced apart from one another and each extending to and resting on the bottom of the tank, and from a level at about the outer periphery of the underside of the foraminous basket there extends radially downwardly inwardly from the intersection of each of the cage-legs with the lowermost cage-legs bracing ring and in contact with the underside of the filter basket a cage bottom-slat terminating at and affixed to said flat circular ring; and affixed to said ring each of three horizontally spaced apart bushing-bracing arms extends radially inwardly upwardly to and affixedly supporting a bushing, and the lower end of the impeller shaft is mounted in said bushing.

15. Apparatus as claimed in any of claims 1, and, wherein there is mounted on the impeller shaft a second pair of diametrically aligned, substantially rectangular impeller arms each having a free end extending separately lengthwise radially outwardly from the shaft toward but significantly spaced away from the filter basket wall.

16. Apparatus as claimed in each of claims 1, and wherein each of the impeller arms is from about one-third to two-thirds of the length of the screen basket radius.

17. A method of concentrating and/or separating discrete pieces of solids such as granules, pellets and particles from a suspension, slurry or mixture of them in a liquid medium, which mixture contains a comparatively smaller amount of a substance that provokes blinding of the separation screen of certain filtering means tried for separating said solid pieces from said liquid medium, which method comprises (a) feeding the aforesaid mixture into a basket-shaped first zone having a vertical cylindrical foraminous bounding surface and a bottom integral with it, said first zone being fixedly positioned coaxially within and (i) radially inwardly spaced away from a vertical cylindrical liquid-tight enclosing surface bounding an open-topped second zone bounded at its bottom by a liquid-tight surface integral with said vertical enclosing surface, and (ii) with the bottom of said first zone being upwardly spaced away from the bottom boundary of said second zone, thereby providing a cup-like portion of said second zone with the vertical annular portion between the vertical boundaries of the first and second zones and the bottom of said second zone being continuous with its annular portion located between the respective bottom portions of said two zones, (b) while said mixture is accumulating in said first zone and filtrate from the mixture is accumulating in said vertical annular portion, exerting on the mixture circularly applied continuous pressure by a pair of diametrically opposed, rectangularly-shaped pressure-imparting means rigidly carried on a rotating shaft extending vertically coaxially in the basket-shaped zone and for at least the entire height thereof and said pressure imparting means from a level about midway of the lower half of that zone's height extending outwardly from the shaft to an extent of from about one-third to about two-thirds of the radius of that zone, thereby to develop and maintain in said mixture substantially cylindrically laminar movement as it is filling up said first zone and at the same time thereby permitting filtrate from said mixture to pass through said foraminous bounding wall and to accumulate in said second zone to a level therein at least equal to that of the final level of the mixture accumulating in said first zone, and (c) continuing the feeding of said mixture into said first zone, while said circularly applied pressure is continued to develop and maintain in the top part of the mixture at least a shallow vortex and with substantially no turbulent agitation and to maintain in said mixture the aforesaid movement, at a rate to maintain the level of filtrate in said second zone at the same as that of the mixture in the first zone while at the same time allowing filtrate to leave from the bottom of said second zone at a rate to allow the filtrate accumulated in the second zone and the mixture accumulated in the first zone to remain at the same level, and (d) allowing the feeding in of the mixture, the withdrawal of filtrate, application of circularly-acting pressure on the mixture, and maintenance of the described even level in both zones to continue until the maximum possible accumulation of concentrated solids is attained in the first zone (i) when the operation is conducted on a batch basis during the foregoing steps, and (ii) likewise when the operation is conducted on a continuous basis by withdrawing concentrated solids from the bottom of the first zone under conditions avoiding their admixture with the filtrate being discharged during the operation and with the concentrated solids withdrawal, filtrate withdrawal, and mixture feeding conducted each at its respective rate to enable maintaining the level of filtrate in the second zone at least equal to that of the mixture accumulated in the first zone.

* * * * *